US012282822B2

(12) United States Patent
Stagg et al.

(10) Patent No.: US 12,282,822 B2
(45) Date of Patent: *Apr. 22, 2025

(54) DEVICE AND METHOD FOR DATA CAPTURE AIMING ASSISTANCE

(71) Applicant: ZEBRA TECHNOLOGIES CORPORATION, Lincolnshire, IL (US)

(72) Inventors: Adrian J. Stagg, Belfountain (CA); Gregory John Evans, Merrickville (CA); Steven William Maddigan, Brampton (CA); John Louis Ingold, Mulmur (CA); Michael Wong, Etobicoke (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/601,677

(22) PCT Filed: Jan. 30, 2020

(86) PCT No.: PCT/US2020/015894
§ 371 (c)(1),
(2) Date: Oct. 5, 2021

(87) PCT Pub. No.: WO2020/205042
PCT Pub. Date: Oct. 8, 2020

(65) Prior Publication Data
US 2022/0215189 A1  Jul. 7, 2022

Related U.S. Application Data

(63) Continuation of application No. 16/376,081, filed on Apr. 5, 2019, now Pat. No. 10,956,694.

(51) Int. Cl.
G06K 7/10 (2006.01)
G06K 7/14 (2006.01)
H04N 23/63 (2023.01)

(52) U.S. Cl.
CPC ....... *G06K 7/10722* (2013.01); *G06K 7/1413* (2013.01); *H04N 23/63* (2023.01); *H04N 23/635* (2023.01)

(58) Field of Classification Search
CPC .............. G06K 7/10722; H04N 23/63; H04N 23/635
See application file for complete search history.

(56) References Cited

U.S. PATENT DOCUMENTS 10,956,694 B2 * 3/2021 Stagg ............... G06K 7/1413
2007/0084926 A1  4/2007 Lopez et al.
(Continued)

OTHER PUBLICATIONS

Krupa et al. "Autonomous 3-D positioning surgical instruments in robotized laparoscopic surgery using visual servoing." In: IEEE transactions on robotics and automation. Oct. 2003 (Oct. 2003) Retrieved on Oct. 4, 2021 (Oct. 4, 2021) from <http://www.isir.upmc.fr/UserFiles/File/Jerome%20Szewczyk/vitrani%202.pdf> entire document.

(Continued)

*Primary Examiner* — Christle I Marshall

(57) ABSTRACT

A data capture device includes: a display, a primary image sensor having a primary field of view centered on a primary optical axis; an auxiliary image sensor having an auxiliary field of view centered on an auxiliary optical axis, wherein the auxiliary field of view is larger than the primary field of view; a memory storing offset data defining an offset between the primary field of view and the auxiliary field of view; a data capture controller connected to the primary image sensor, the auxiliary image sensor and the memory; wherein the data capture controller is configured to: responsive to activation of an aiming mode, control the auxiliary (Continued)

image sensor to capture a video stream; select, according to the offset data, a portion of the video stream corresponding to the primary field of view; and present the selected portion of the video stream on the display.

14 Claims, 9 Drawing Sheets

(56) References Cited

U.S. PATENT DOCUMENTS

| | | |
|---|---|---|
| 2008/0291280 A1 | 11/2008 | Peters, III et al. |
| 2011/0304693 A1 | 12/2011 | Border et al. |
| 2012/0314036 A1 | 12/2012 | Dahi et al. |
| 2013/0242059 A1 | 9/2013 | Dahi et al. |
| 2019/0068886 A1* | 2/2019 | Baek .................... H04N 23/632 |

OTHER PUBLICATIONS

International Search Report and Written Opinion for International Application No. PCT/US2020/015894 mailed on Apr. 30, 2020.

* cited by examiner

DEVICE AND METHOD FOR DATA CAPTURE AIMING ASSISTANCE

BACKGROUND

Data capture devices such as handheld computers may be employed for data capture operations (e.g. barcode scanning) under a variety of conditions. For example, such devices can be deployed to perform barcode scanning at various ranges, under various lighting conditions, and in connection with a variety of objects bearing the codes to be scanned. Such devices may have mechanisms to aid an operator in aiming the device, such as a laser emitter to project a dot on the surface to be scanned. Under certain conditions, however, such mechanisms may fail (e.g. the laser dot mentioned above may not be visible beyond certain distances, or under certain lighting conditions), leading to reduced scan accuracy.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1B:
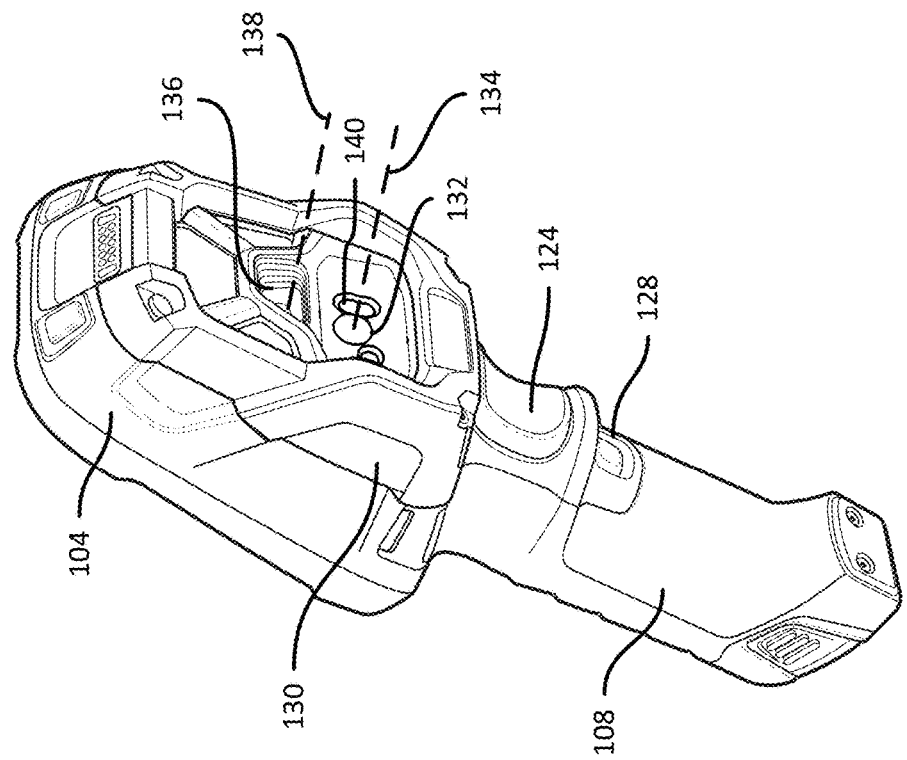
FIG. 1B is a rear perspective view of the data capture device of FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture device, comprising: a housing; a display supported by the housing; a primary image sensor supported by the housing and having a primary field of view centered on a primary optical axis; an auxiliary image sensor supported by the housing and having an auxiliary field of view centered on an auxiliary optical axis, wherein the auxiliary field of view is larger than the primary field of view; a memory storing offset data defining an offset between the primary field of view and the auxiliary field of view; a data capture controller connected to the primary image sensor, the auxiliary image sensor and the memory; wherein the data capture controller is configured to: responsive to activation of an aiming mode, control the auxiliary image sensor to capture a video stream; select, according to the offset data, a portion of the video stream corresponding to the primary field of view; and present the selected portion of the video stream on the display.

Additional examples disclosed herein are directed to a method in a data capture device having (i) a display, (ii) a primary image sensor having a primary field of view centered on a primary optical axis, and (iii) an auxiliary image sensor having an auxiliary field of view centered on an auxiliary optical axis, wherein the auxiliary field of view is larger than the primary field of view, the method comprising: storing offset data in a memory of the data capture device defining an offset between the primary field of view and the auxiliary field of view; at a data capture controller of the data capture device connected to the primary image sensor, the auxiliary image sensor and the memory: responsive to activation of an aiming mode, controlling the auxiliary image sensor to capture a video stream; selecting, according to the offset data, a portion of the video stream corresponding to the primary field of view; and presenting the selected portion of the video stream on the display.

Figure 1A:
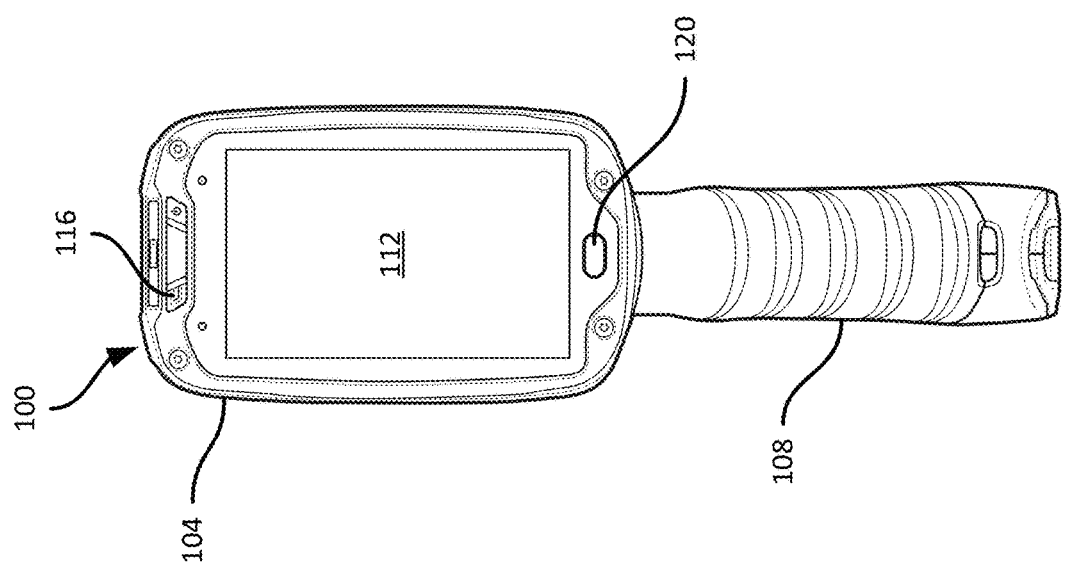
FIG. 1A is a front view of a data capture device.

FIGS. 1A and 1B depict a data capture device 100 that may be deployed in a wide variety of environments, including transport and logistics facilities (e.g. warehouses), healthcare facilities, and the like. The data capture device 100 in the example illustrated in FIG. 1. is a handheld data capture device including a housing defined by a body 104 and a handle 108. The housing supports various other components of the device 100, as will be discussed below in greater detail.

As shown in FIG. 1A, which illustrates a front view of the device 100, the body 104 of the housing supports a display 112, which may include an integrated touch screen. The body 104 also supports various inputs, such as a microphone 116 and a button 120. As shown in FIG. 1B, which illustrates a rear perspective view of the device 100, the handle 108 supports additional inputs, including a primary trigger button 124 and an auxiliary trigger button 128. The body 104 and/or the handle 108 can support additional inputs in other examples, or the above-mentioned inputs can be omitted in other examples. The body 104 can also support outputs, such as a speaker 130 (an additional speaker may be provided on the opposite side of the body 104 than the side shown in FIG. 1B).

The body 104 also supports, as shown in FIG. 1B, a primary image sensor 132, also referred to herein as an imager 132. The imager 132 has a primary optical axis 134 extending away from the imager 132, on which a primary field of view (FOV) of the imager 132 is centered. The body 104 further supports an auxiliary image sensor 136, also referred to herein as a camera 136. The camera 136 has an auxiliary optical axis 138 extending away from the camera 136, on which an auxiliary FOV of the camera 136 is centered. The imager 132 and the camera 136 are substantially coplanar (i.e. the imager 132 and the camera 136 are located in a common image sensor plane), although as shown in FIG. 1B the imager 132 and the camera 136 are at different locations within that plane.

The primary image sensor 132 enables the device 100 to perform data capture operations such as barcode scanning. In particular, the primary image sensor 132 is configured to capture one or more images responsive to activation of a primary input (e.g. the primary trigger 124), and to detect and decode a machine-readable indicium in such images. A wide variety of indicia can be detected and decoded following capture by the imager 132, including 1D and 2D barcodes.

As will be discussed in greater detail below, the imager 132 has an FOV that is smaller (i.e. narrower) than the FOV of the camera 136. As will be apparent to those skilled in the art, to capture images of an indicium on an object, the device 100 must be oriented (i.e. aimed, by an operator of the device 100) such that the indicium falls within the FOV of the imager 132. To assist in aiming the device 100 to capture the indicium, the device 100 can also include an emitter 140 such as a laser diode, configured to emit a laser beam coinciding with the primary optical axis 134 to project a visible dot on an object at which the imager 132 is aimed. However, under some conditions the above-mentioned dot may not be visible. The device 100 therefore implements additional functionality to assist in aiming the imager 132 by using the camera 136 to simulate the current FOV of the imager 132 on the display 112.

Figure 2:
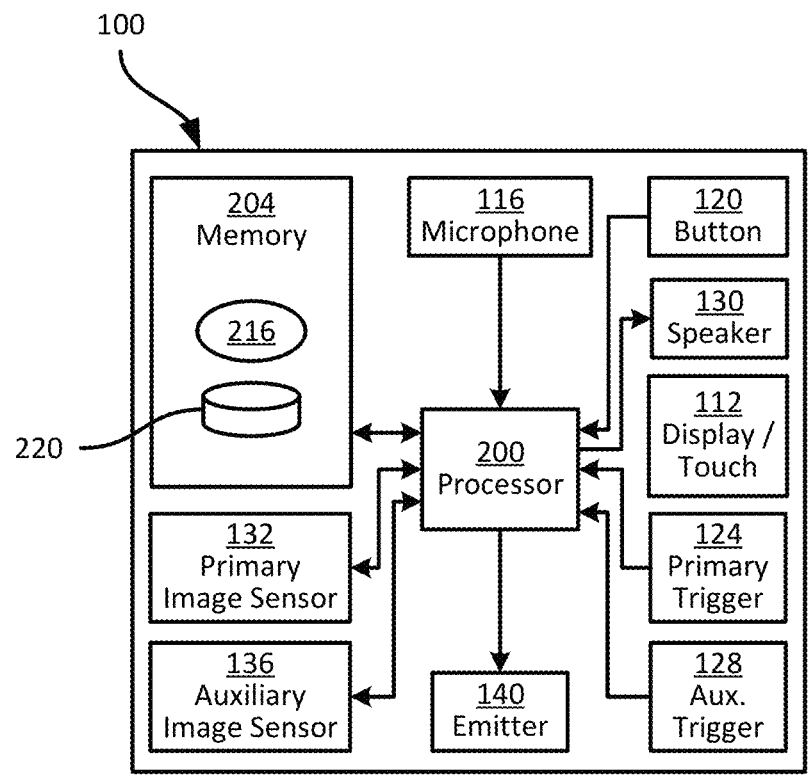
FIG. 2 is a block diagram of certain internal components of the data capture device of FIGS. 1A and 1B.

Before discussing the aiming assist functions implemented by the device 100, certain internal components of the device 100 are described in further detail, with reference to FIG. 2.

As shown in FIG. 2, the device 100 includes a central processing unit (CPU), also referred to as a processor 200, interconnected with a non-transitory computer readable storage medium, such as a memory 204. The memory 204 includes a suitable combination of volatile memory (e.g. Random Access Memory (RAM)) and non-volatile memory (e.g. read only memory (ROM), Electrically Erasable Programmable Read Only Memory (EEPROM), flash). The processor 200 and the memory 204 each comprise one or more integrated circuits (ICs).

The components of the device 100 shown in FIGS. 1A and 1B (that is, the display 112, microphone 116, button 120, triggers 124 and 128, image sensors 132 and 136, and the emitter 140) are interconnected with the processor 200 via one or more communication buses. The components of the device 100 are powered by a battery or other power source, over the communication buses or by distinct power buses.

The memory 204 stores a plurality of applications, each including a plurality of computer readable instructions executable by the processor 200. The execution of the above-mentioned instructions by the processor 200 causes the device 100 to implement certain functionality, as discussed herein. The applications are therefore said to be configured to perform that functionality in the discussion below. In the present example, the memory 204 of the device 100 stores a data capture application 216, also referred to herein as the application 216. The device 100 is configured, via execution of the application 216 by the processor 200, to perform data capture operations and implement an aiming mode for such data capture operations under certain conditions. The memory 204 also stores a repository 220 containing offset data for use in implementing the aiming mode mentioned above. The contents of the offset data in the repository 220, as well as mechanisms for using and updating the offset data, will be discussed in greater detail below.

The processor 200, as configured via the execution of the application 216, may also be referred to as a data capture controller. In some embodiments, the functionality described herein is implemented by two or more controllers, rather than by the processor 200 exclusively. For example, in some embodiments the device 100 includes a scanning controller configured to control the imager 132 and the emitter 140, and to decode data from images captured by the imager 132. The scanning controller passes decoded data to the processor 200 for subsequent processing. The processor 200, meanwhile, controls the camera 136, the display 112 and the inputs mentioned above. In such embodiments, the data capture controller is therefore implemented by such a scanning controller and the processor 200 together.

In further embodiments, the processor and/or the above-mentioned scanning controller are implemented as one or more specifically-configured hardware elements, such as field-programmable gate arrays (FPGAs) and/or application-specific integrated circuits (ASICs).

Figure 3:
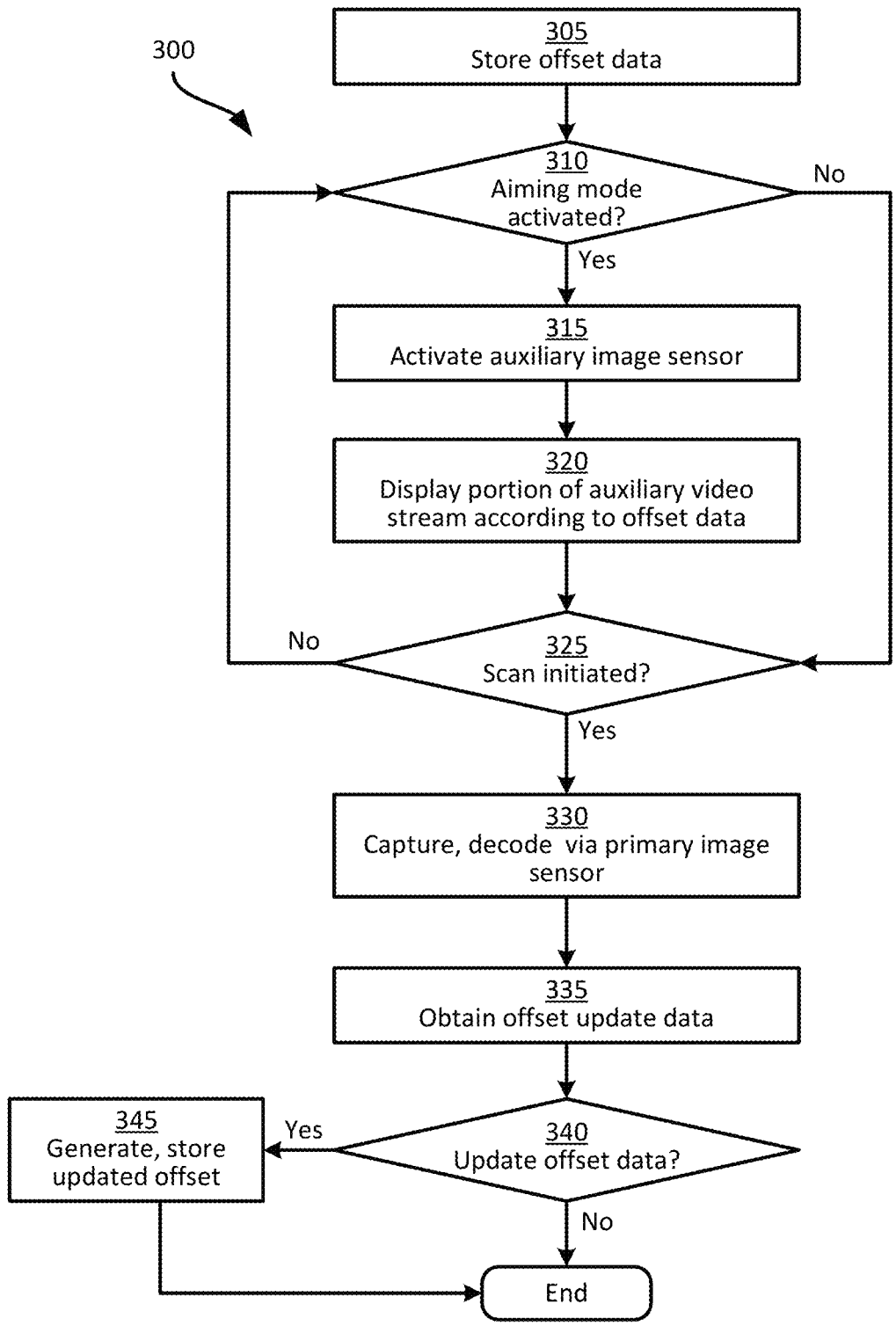
FIG. 3 is a flowchart of a method of data capture aiming assistance.

Turning now to FIG. 3, the operation of the device 100 will be described in further detail. FIG. 3 illustrates a flowchart of a method 300 of data capture aiming assistance. The performance of the method 300 will be described in conjunction with its performance by the device 100.

At block 305, the device 100 is configured to store the above-mentioned offset data, e.g. in the repository 220. The offset data defines an offset between the primary field of view of the imager 132 and the auxiliary field of view of the camera 136. More specifically, as will be described with reference to FIGS. 4A and 4B, the offset data defines an offset between the center of the primary field of view and the center of the auxiliary field of view. In effect, therefore, the offset data also defines an offset between the primary and auxiliary optical axes.

Figure 4A:
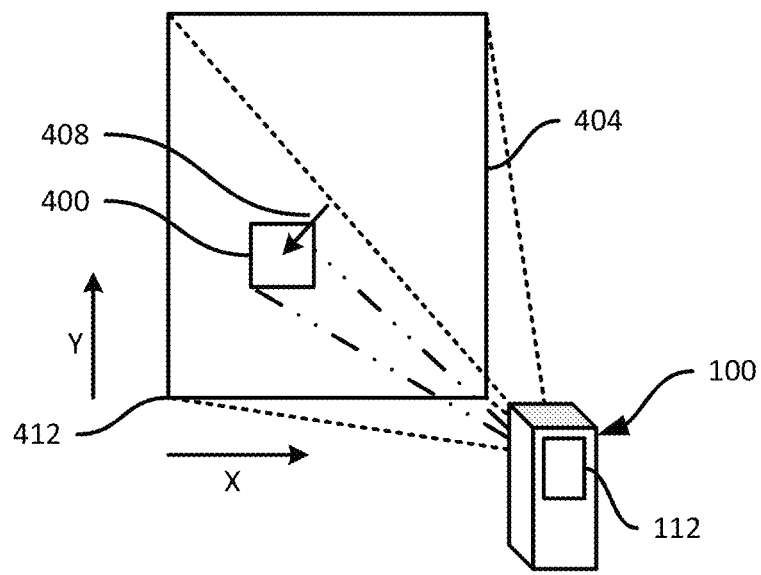
FIG. 4A is a diagram illustrating respective fields of view of primary and auxiliary image sensors of the data capture device of FIGS. 1A and 1B.

Turning to FIG. 4A, a simplified illustration of the device 100 is shown, illustrating the relative positions and sizes of a primary field of view 400 of the imager 132 and an auxiliary field of view 404 of the camera 136. As is shown in FIG. 4A, and as noted earlier, the primary FOV 400 is smaller than the auxiliary FOV 404. In addition, due to the distinct physical positions of the imager 132 and the camera 136 on the device 100 (shown in FIG. 1B), the FOV 400 is not centered within the FOV 404 (that is, the optical axes 134 and 138 are not coincident, though they may be parallel to one another). Instead, the center of the FOV 400 is offset from the center of the FOV 404 by an offset vector 408 illustrated in FIG. 4A. The offset data stored at block 305 defines the offset vector 408. As will be apparent, the FOV 404 of the camera 136 can be represented as a pixel array having an origin 412, in which each position within the FOV 404 has an X pixel coordinate and a Y pixel coordinate. The offset data may include horizontal and vertical pixel distances defined within the frame of reference defined by the origin 412 and the X and Y axes indicated in FIG. 4A.

The offset data can include additional parameters beyond the distances noted above. In some examples, the offset data also includes dimensions of the FOV 400, expressed according to the frame of reference mentioned above (i.e. in pixel dimensions) and shown in FIG. 4B as a region 416. The region 416 has the same size as the FOV 400 shown in FIG. 4A. The offset data can also include, in some examples, dimensions of an intermediate FOV, larger than the FOV 400 and smaller than the FOV 404, indicated in FIG. 4B as a region 420. That is, the offset data as shown graphically in FIG. 4B can include three pairs of values: the distances defining the vector 408, dimensions defining the region 416, and dimensions defining the region 420.

Figure 5:
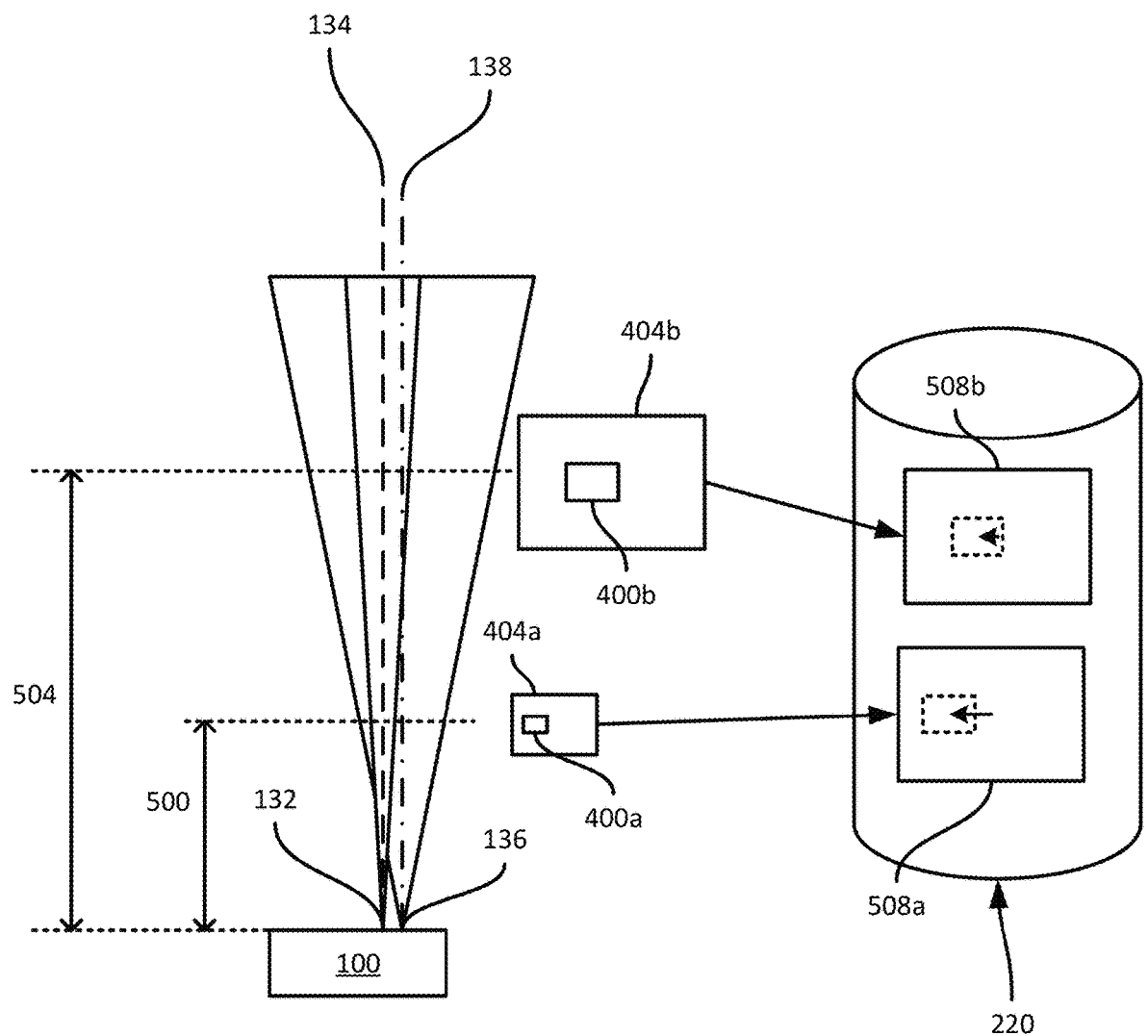
FIG. 5 is a diagram illustrating subsets of offset data maintained by the data capture device of FIGS. 1A and 1B, corresponding to different imaging ranges.

In some embodiments, the offset data includes the above-mentioned data (i.e. at least the parameters defining the vector 408, and optionally parameters defining one or both of the regions 416 and 420) for each of a plurality of ranges. As will now be apparent, the position of the FOV 400 within the FOV 404 changes according to distance from the device 100. Turning to FIG. 5, a side view of the device 100 is shown, along with the FOVs 400 and 404 at various distances. In particular, at a first distance (i.e. a first range) 500 from the imager 132 and the camera 136, a first primary FOV 400a and auxiliary FOV 404a are illustrated. Further, at a second range 504, a second primary FOV 400b and auxiliary FOV 404b are illustrated. As is evident from the FOVs 400a, 400b and 404a, 404b, the offset between the FOVs 400 and 404 varies with range. The repository 220 may therefore contain subsets 508a, 508b of offset data, with each subset 508 corresponding to a distinct range or subset of ranges. The repository 220 can be stored, for example, as a lookup table in the memory 204, with a plurality of entries each corresponding to a given range or subset of ranges.

Returning to FIG. 3, the offset data stored at block 305 can be obtained for storage in a variety of ways. For example, predetermined offset data can be loaded into the memory 204 during the manufacturing of the device 100, according to specified relative positions of the imager 132 and the camera 136. In other examples, each device 100 can be calibrated at the manufacturing stage by capturing images of a predetermined object (e.g. a binary-coded image) with both the imager 132 and the camera 136, and registering the captured images to determine the position of the primary FOV within the auxiliary FOV. As will be discussed in greater detail below, the device 100 can be configured to update the offset data (e.g. to recalibrate) under certain conditions.

At block 310, the device 100 determines whether an aiming mode has been activated. It is assumed that prior to the performance of block 310, the device 100 has entered a data capture mode. In the data capture mode, the processor 200 awaits the activation of a primary input, such as the primary trigger 124. In response to activation of the primary trigger 124, the processor 200 controls the imager 132 to capture an image of its current FOV, and to detect and decode an indicium in the captured image. When in the data capture mode, the emitter 140 can be controlled to emit a beam to project an aiming dot onto any objects within the primary FOV 400.

Activation of the aiming mode while the data capture mode is active can be initiated by activation of an auxiliary input, such as the auxiliary trigger 128. Various other inputs can be employed to activate the aiming mode, however. For example, the auxiliary input can be the microphone 116, and an audible command issued by the operator of the device 100 can be captured by the microphone 116 and detected by the processor 200.

When the aiming mode has not been activated, the device 100 continues to operate in the data capture mode (without aiming assistance), proceeding to block 325 as will be discussed below. When the aiming mode has been activated, however (i.e. when the determination at block 310 is affirmative), the device 100 proceeds to block 315.

At block 315, the processor 200 activates the auxiliary image sensor 136, which otherwise remains inactive during the data capture mode (as the primary image sensor 132 is employed to capture and detect indicia such as barcodes). Activation of the camera 136 causes the camera 136 to capture a video stream, which is provided to the processor 200.

At block 320, the processor 200 selects a portion of the above-mentioned video stream and controls the display 112 to present the selected portion, substantially in real-time (i.e. substantially simultaneously with the capture of the video stream). That is, the processor 200 is configured to select a portion of each frame of the video stream captured by the camera 136, and to present the selected portions in sequence on the display.

The portion of the video stream selected for presentation on the display 112 is selected according to the above-mentioned offset data. In general, the selected portion of the video stream captured by the camera 136 provides a virtual viewport for the imager 132, presenting to the operator of the device 100 a current representation of the primary FOV of the imager 132. However, the viewport is referred to as virtual because it is obtained not via the imager 132 itself, but via the camera 136.

Figure 6A:
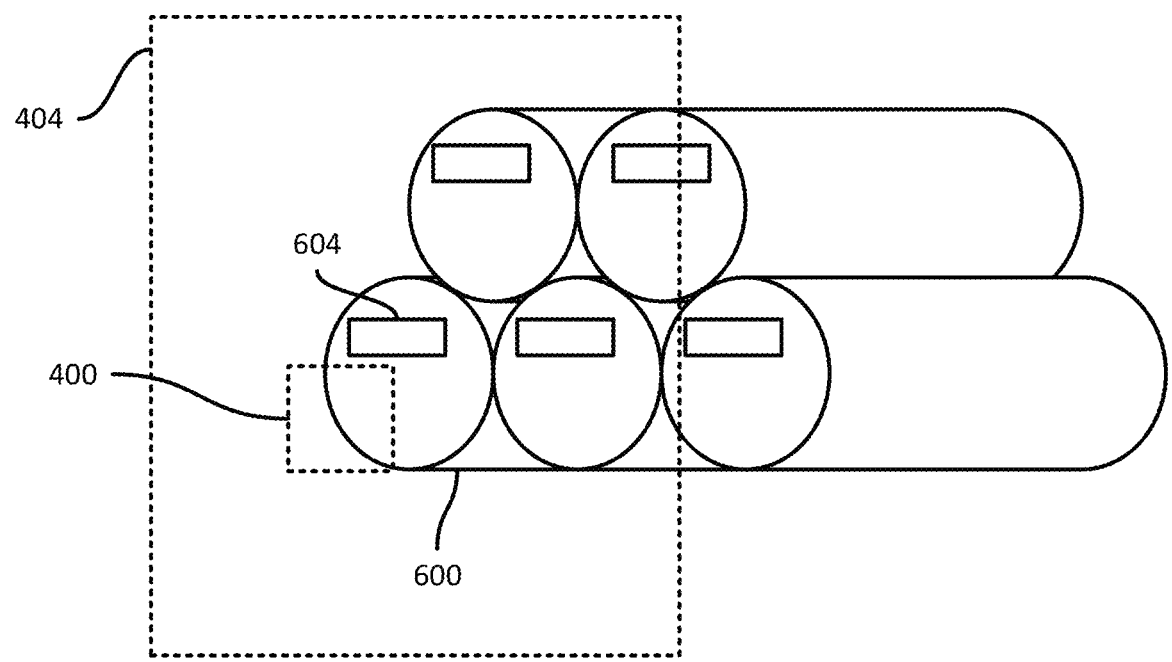
FIG. 6A is a diagram illustrating objects bearing indicia for data capture via performance of the method of FIG. 3.

Turning to FIG. 6A, a set of objects, including an object 600 (e.g. a roll of steel in a warehouse) bearing an indicium 604 such as a barcode, is shown. FIG. 6A also illustrates the primary FOV 400 of the imager 132 and the auxiliary FOV 404 of the camera 136 following activation of the aiming mode at block 315. As seen in FIG. 6A, the indicium 604 is centered within the auxiliary FOV 404, but is not within the primary FOV 400. Therefore, if a scan operation were to be initiated, the indicium 604 would not be detected. By applying the offset data discussed in connection with FIGS. 4A, 4B and 5, the processor 200 is configured to select a portion 608 of the FOV 404, illustrated in FIG. 6B. When, as discussed in connection with FIG. 5, the offset data includes a plurality of subsets of offset data corresponding to respective imaging ranges, the processor 200 receives, e.g. from the imager 132 or the camera 136, a detected range indicating the distance from the device 100 to the objects within the primary FOV 400 (if the range is received from the imager 132) or the auxiliary FOV 404 (if the range is received from the camera 136). The processor 200 selects a subset of offset data that corresponds to the received range.

Figure 4B:
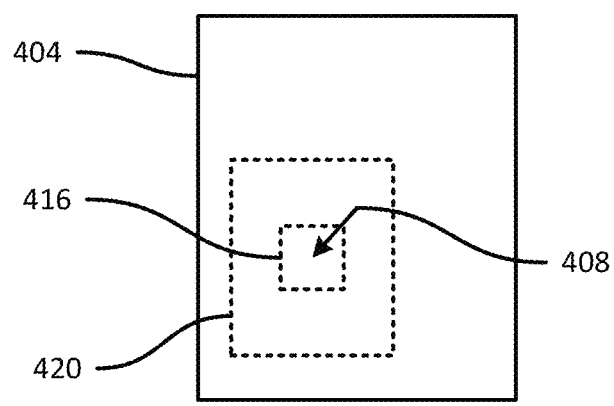
FIG. 4B is a diagram illustrating offset data maintained by the data capture device of FIGS. 1A and 1B.
Figure 6B:
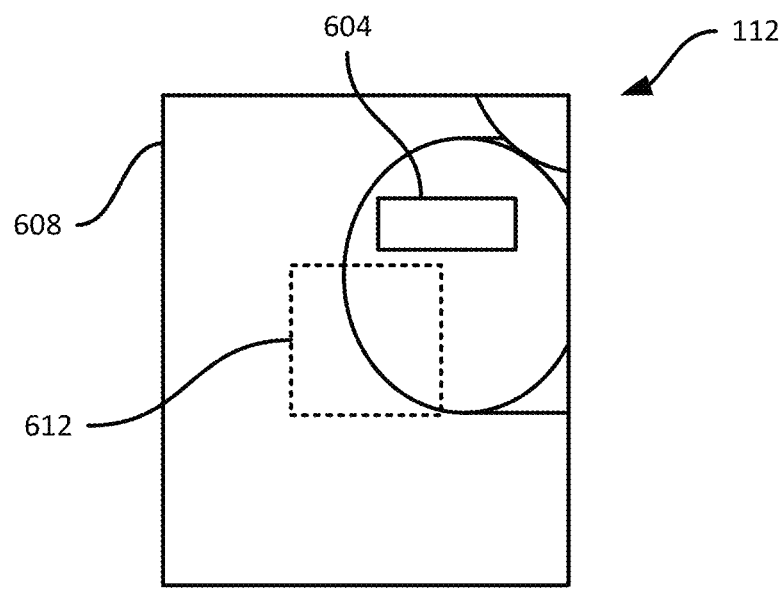
FIG. 6B is a diagram illustrating a performance of block 320 of the method of FIG. 3.

The position and size of the portion 608 is defined by the region 420 shown in FIG. 4B. As seen in FIG. 6B, the portion 608 encompasses both the indicium 604 and the primary FOV 400. The processor 200 also presents on the display 112 a bounding box 612 that indicates the size of the primary FOV 40.

Stated another way, at block 320 the processor 200 controls the camera 136 to capture an image (e.g. a frame in the above-mentioned video stream), depicting the auxiliary FOV 404 as shown in FIG. 6A. The processor 200 then selects the portion 608 of the captured image having dimensions as specified by the region 420 shown in FIG. 4B, and centered at a point in the captured image that is offset from the center of the FOV 404 by the offset vector 408. The processor 200 further generates the bounding box 612 having the dimensions of the region 416 as shown in FIG. 4B, and centered at the same point as the portion 608.

Figure 7A:
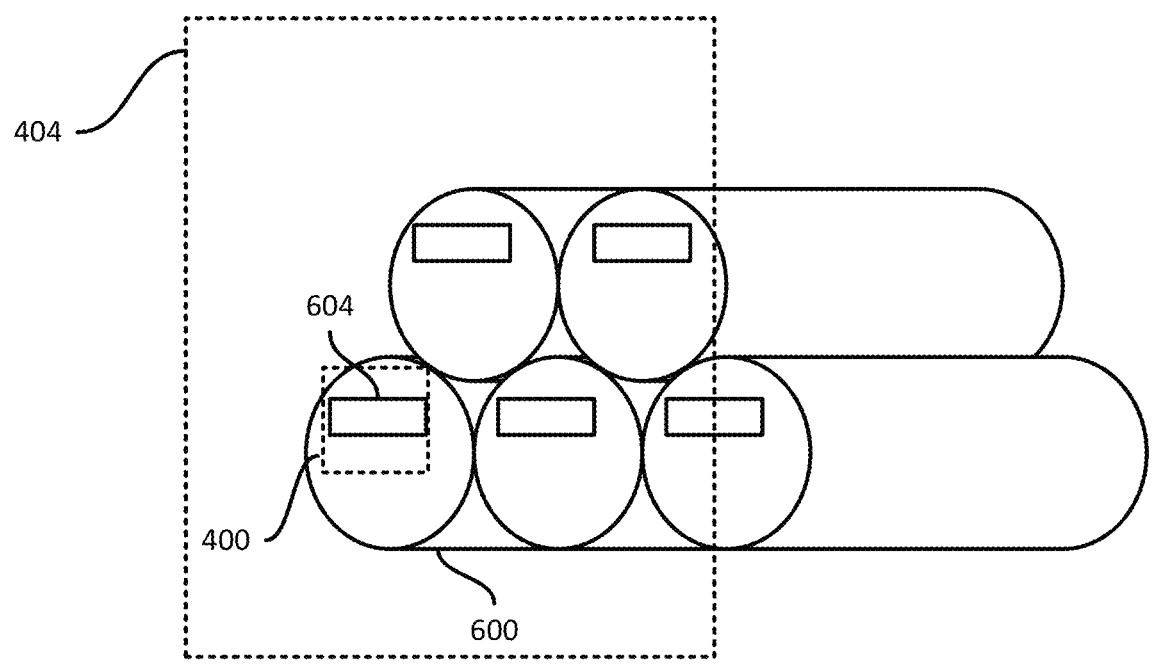
FIG. 7A is a diagram illustrating objects bearing indicia for data capture via performance of the method of FIG. 3, following adjustment of an aimed position of the data capture device.
Figure 7B:
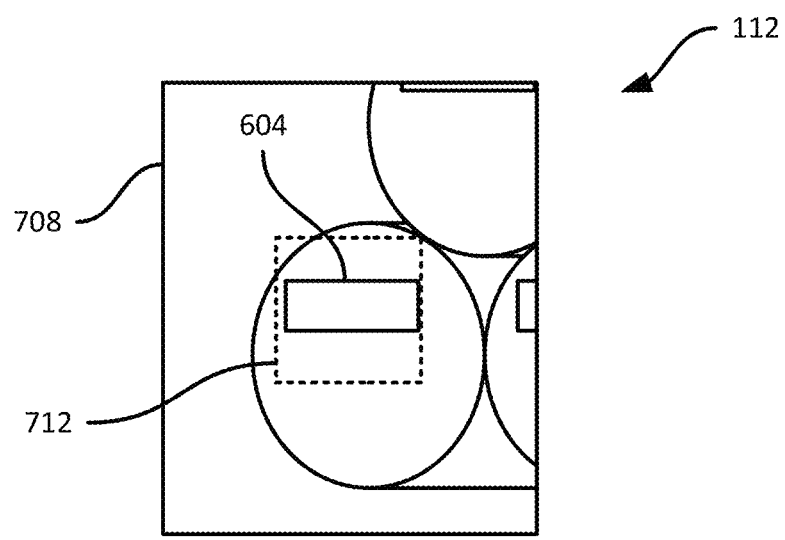
FIG. 7B is a diagram illustrating a further performance of block 320 of the method of FIG. 3.

At block 325, the processor 200 determines whether a scan operation has been initiated, e.g. via activation of the primary trigger 124. When the determination is negative, the performance of the method 300 returns to block 310, and the processor 200 determines whether to continue the generation of the virtual viewport as discussed above via blocks 315 and 320. Turning to FIGS. 7A and 7B, the device 100 has been reoriented to shift the auxiliary FOV 404 and the primary FOV 400, with the aiming mode remaining activated. The display 112 is therefore updated by the processor to present a portion 708 of the image captured by the camera 136, along with a bounding box 712 indicating that the indicium 604 now falls within the primary FOV 400 of the imager 132.

Returning again to FIG. 3, at a subsequent performance of block 325 it is assumed that the primary trigger 124 is activated, and the determination at block 325 is therefore affirmative. The processor 200 is configured to proceed to block 330, at which the imager 132 is controlled to capture one or more images. The processor 200 is configured to detect and decode, from the image captured by the imager 132, an indicium (e.g. the indicium 604 shown in FIGS. 6A-6B and 7A-7B). Various suitable mechanisms for detecting and decoding indicia may be implemented. Such mechanisms are not the subject of the present discussion, and will therefore not be described in detail herein. The processor 200 obtains, as a result of the performance of block 330, at least decoded data (e.g. a string of text or the like) encoded in the indicium 604. The processor 200 may also obtain a location of the indicium 604 within the primary FOV 400 (e.g. expressed as pixel coordinates), as well as a decode time elapsed between activation of the primary trigger 124 and completion of the decoding. The decode time may also be referred to as a "trigger-to-beep" time.

The device 100, therefore is enabled to provide a virtual viewport for the imager 132 via control of the camera 136 and use of the offset data. In the embodiment illustrated in FIGS. 6A-7B, for example, the virtual viewport provides a representation of the current primary FOV 400 of the imager 132 centered on the display 112, and also provides additional image data around such a representation, to assist the operator of the device 100 in determining whether or how to adjust aiming of the device 100.

The offset data, as will now be apparent to those skilled in the art, describes the relative physical positions and orientations of the imager 132 and the camera 136. As will now be apparent to those skilled in the art, the relative physical positions and orientations of the imager 132 and the camera 136 may change over time for a given device 100. For example, dropping a device 100 may lead to minor physical shifts in components. Further, the predefined offset data provided at manufacturing may not account for deviations from specified component positions. The device 100 is therefore also enabled, in some embodiments, to update the offset data, as will be discussed below in connection with the remainder of the method 300. In other embodiments, the updating of offset data may be omitted, and the performance of the method 300 may therefore conclude after block 330. The memory 204, in further embodiments, stores a configurable setting defining whether or not the self-calibration routines discussed below are enabled. The setting can be altered via input data received at the inputs mentioned above, via the touch screen integrated with the display 112, or the like.

At block 335, the processor 200 is configured to obtain offset update data. The offset update data, as will be discussed below, includes one or more attributes that can be processed to determine whether to alter the offset data as currently stored in the repository 220. Various examples of offset update data are contemplated. In some examples, the offset update data includes a location, within the auxiliary FOV 404 (i.e. within a frame of the video stream captured by the camera 136), of the dot projected by the emitter 140. That is, the processor 200 is configured to detect, in the video stream, the projected dot and when the dot is detected, to determine the location (e.g. in pixel coordinates relative to the origin 412) of the dot.

The processor 200 is configured to detect the dot based on any suitable image attributes. For example, the processor 200 can detect a region of the image having a predefined color corresponding to the color of the beam emitted by the emitter 140. In a further example, the processor 200 can detect a region of the image having an intensity exceeding a predefined threshold. In further examples, the processor 200 controls the emitter 140 to modulate the beam, such that the intensity, color, or both of the dot are modulated over time. The processor 200, in such examples, to detect the presence of corresponding modulation over a sequence of image frames in the video stream captured by the camera 136. The detection of the above attributes can also be combined to detect the dot.

Figure 8:
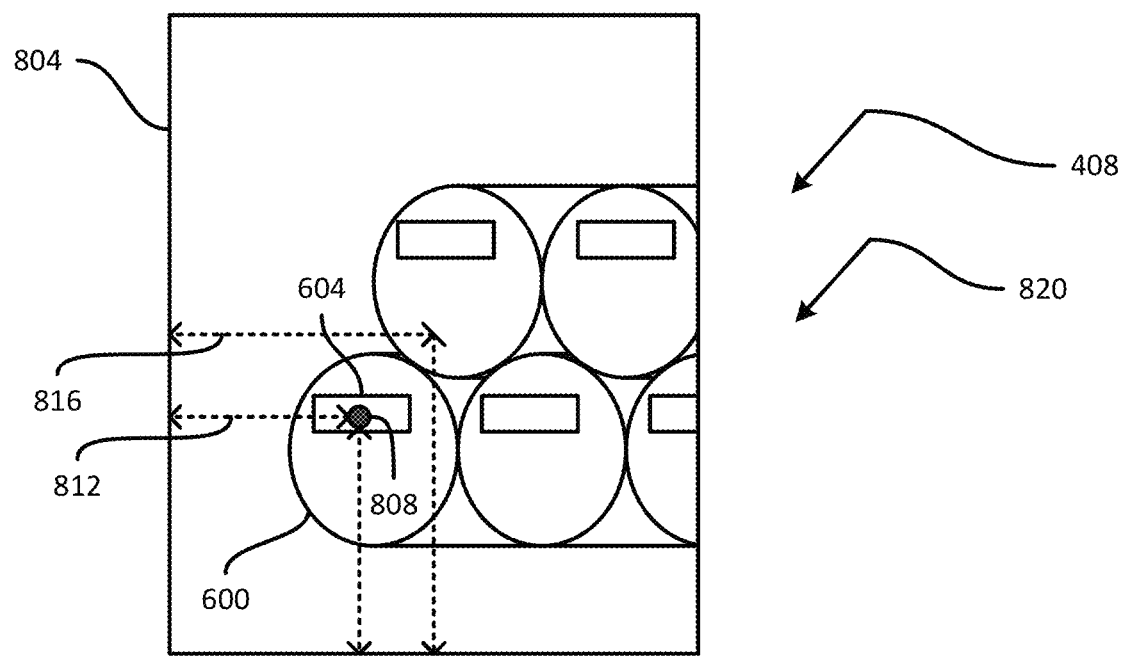
FIG. 8 is a diagram illustrating the detection of a projected dot at block 335 of the method of FIG. 3.

Referring to FIG. 8, an image 804 captured via the camera 136 (i.e. representing the auxiliary FOV 404) depicts the object 600 and indicium 604 as discussed above, as well as a dot 808 projected on the object 600 by the emitter 140. The location of the dot 808 in the image 804 (represented by the coordinates 812) is obtained at block 335. At block 340, the processor 200 determines whether to update the offset data, for example by determining whether an offset vector between the location defined by the coordinates 812 and the center of the image 804 (defined by the coordinates 816) deviates from the offset vector 408 defined in the repository 220 (e.g. for the current range). When the determination is negative at block 340, the offset data in the repository 220 is not altered, and performance of the method 300 ends. When the determination at block 340 is affirmative, however, the processor 200 updates the offset data in the repository 220 at block 345, e.g. by replacing the offset vector 408 with an adjusted offset vector defined between the coordinates 816 and 812. In the present example, the offset vector 408 is shown alongside an offset vector 820 generated from the image 804. As is evident from FIG. 8, the offset vectors 408 and 820 are identical, and the determination at block 340 is therefore negative.

Returning to block 335, in other embodiments the offset update data can include, in addition to or instead of the dot-based data mentioned above, locations of indicia detected and decoded in a number of performances of block 330, as well as the decode times for each indicium. As will be understood by those skilled in the art, the processor 200 typically captures a stream of image frames via the imager 132, and searches each frame in a predefined pattern (e.g. a spiral beginning at the center of the frame). Therefore, low decode times indicate that few frames were captured before the indicium was detected, and/or that minimal searching within a frame was required. This indicates in turn that the device 100 was accurately aimed when the primary trigger 124 was activated (i.e. when the decode timer was initiated).

In contrast, elevated decode times indicate that a larger number of frames were captured before the indicium was detected and/or that more extensive searching within a frame was required. This indicates that the initial aiming of the device 100 may have had reduced accuracy.

In such embodiments, the determination performed by the processor at block 340 can include a determination of whether a sufficient number of decode operations have been performed to adjust the offset data based on the above-mentioned locations and decode times. When the determination at block 340 is affirmative, at block 345 the processor 200 determines an adjustment to the offset data based on the decode locations and decode times.

Figure 9A:
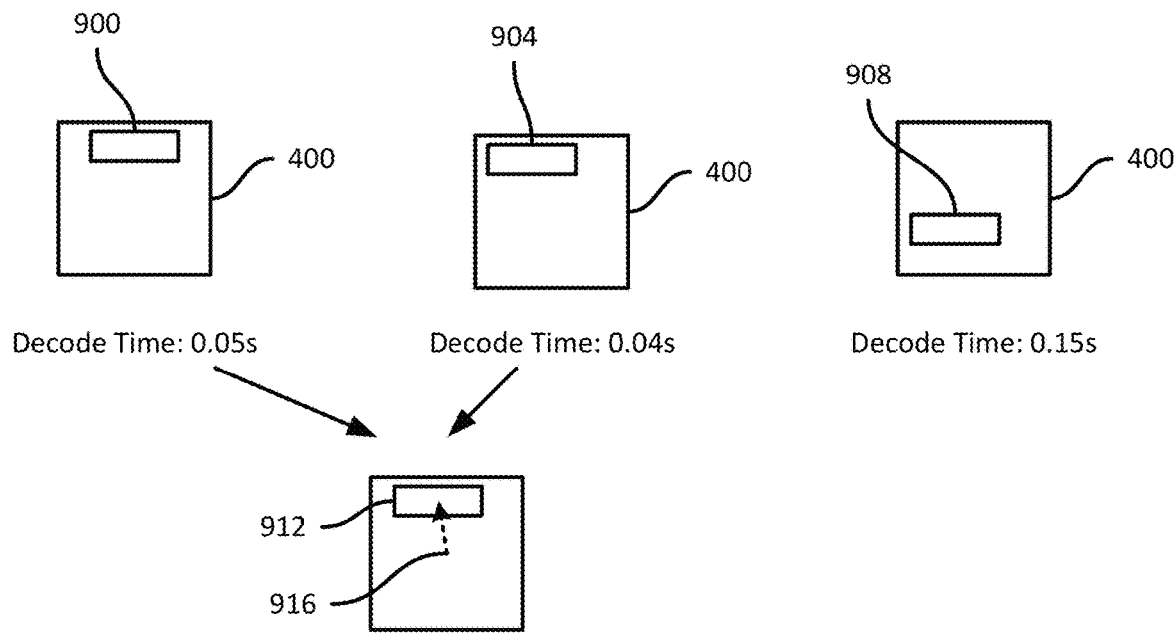
FIG. 9A is a diagram illustrating a set of indicium locations and decode times resulting from distinct performances of block 330 of the method of FIG. 3.

For example, turning to FIG. 9A, locations and decode times from three example decode operations are shown. In particular, locations 900, 904 and 908 are illustrated relative to the primary FOV 400, and associated decode times are shown with each location. The processor 200 is configured to select a subset of the decode times (e.g. the lowest 50% of the decode times, all decode times below a configurable threshold, or the like). The processor 200 then, having selected the subset of decode times, to determine an average location from the corresponding locations. Thus, as shown in FIG. 9A, having selected the decode times associated with the locations 900 and 904 the processor generates an average location 912 from the locations 900 and 904. The processor 200 then determines an offset adjustment 916 based on the average location 912 relative to the center of the primary FOV 400.

Figure 9B:
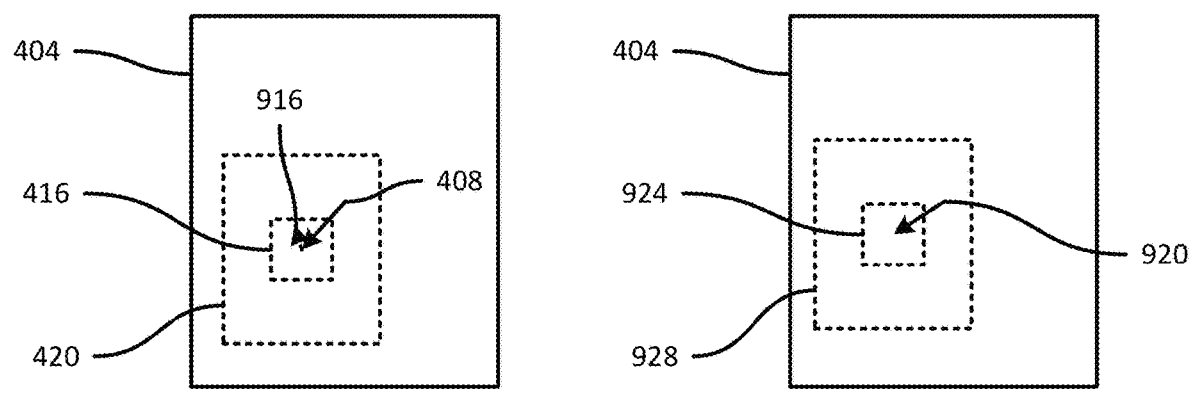
FIG. 9B is a diagram illustrating updating of offset data at block 345 of the method of FIG. 3, based on the data shown in FIG. 9A.

Referring to FIG. 9B, the processor then applies the adjustment 916 to the current offset data (defining the offset vector 408), e.g. summing the offset vector 408 and the adjustment 916, to generate updated offset data defining an offset vector and regions 924 and 928. The virtual viewport, in other words, has been shifted up and to the left, in the direction where the lowest decode times have been obtained.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A data capture device, comprising:
a housing;
a display supported by the housing;
a primary image sensor supported by the housing and having a primary field of view centered on a primary optical axis;
an auxiliary image sensor supported by the housing and having an auxiliary field of view centered on an auxiliary optical axis, wherein the auxiliary field of view is larger than the primary field of view;
a memory storing offset data defining an offset between the primary field of view and the auxiliary field of view;
a data capture controller connected to the primary image sensor, the auxiliary image sensor and the memory, wherein the data capture controller is configured to:
responsive to activation of an aiming mode, control the auxiliary image sensor to capture a video stream within the auxiliary field of view,
select, according to the offset data, a portion of the video stream corresponding to the primary field of view of the primary image sensor, and
present the selected portion of the video stream, based on the offset data, on the display.

2. The data capture device of claim 1, wherein the data capture controller is further configured to present, with the selected portion of the video stream, a boundary indicating the primary field of view.

3. The data capture device of claim 1, wherein the primary image sensor and the auxiliary image sensor are supported by the housing within an image sensor plane.

4. The data capture device of claim 3, wherein the offset data defines a distance between the primary image sensor and the auxiliary image sensor within the image sensor plane.

5. The data capture device of claim 3, wherein the offset data defines a plurality of distances within the image sensor plane, each of the plurality of distances corresponding to a range.

6. The data capture device of claim 1, wherein the data capture controller is configured to present the selected portion of the video stream centered on the display.

7. A method in a data capture device, the method comprising:
storing offset data in a memory of the data capture device, the offset data defining an offset between a primary field of view of a primary image sensor and an auxiliary field of view of an auxiliary image sensor;
responsive to activation of an aiming mode, controlling the auxiliary image sensor to capture a video stream within the auxiliary field of view;
selecting, according to the offset data, a portion of the video stream corresponding to the primary field of view of the primary image sensor; and
presenting the selected portion of the video stream on a display of the data capture device.

8. The method of claim 7, further comprising: presenting on the display, with the selected portion of the video stream, a boundary indicating the primary field of view.

9. The method of claim 7, further comprising:
determining that the data capture operation has been initiated responsive to detecting activation of a primary input of the data capture device; and
activating the aiming mode responsive to activation of an auxiliary input of the data capture device.

10. The method of claim 7, wherein the primary image sensor and the auxiliary image sensor are supported within an image sensor plane by a housing of the data capture device.

11. The method of claim 10, wherein the offset data defines a distance between the primary image sensor and the auxiliary image sensor within the image sensor plane.

12. The method of claim 10, wherein the offset data defines a plurality of distances within the image sensor plane, each of the plurality of distances corresponding to a range.

13. The method of claim 7, wherein presenting the selected portion of the video stream comprises presenting the selected portion centered on the display.

14. A non-transitory computer-readable medium storing computer-readable instructions executable by a controller of a data capture device to cause the data capture device to:
store offset data in a memory of the data capture device, the offset data defining an offset between a primary field of view of a primary image sensor and an auxiliary field of view of an auxiliary image sensor;
responsive to activation of an aiming mode, control the auxiliary image sensor to capture a video stream within the auxiliary field of view;
select, according to the offset data, a portion of the video stream corresponding to the primary field of view; and
present the selected portion of the video stream on a display of the data capture device, based on the offset data between the auxiliary field of view and the primary field of view.

* * * * *